(12) United States Patent
Doherty et al.

(10) Patent No.: US 6,897,581 B2
(45) Date of Patent: May 24, 2005

(54) HIGH SPEED GENERATOR WITH THE MAIN ROTOR HOUSED INSIDE THE SHAFT

(75) Inventors: Kieran P. J. Doherty, Oro Valley, AZ (US); David E. Stout, Tucson, AZ (US); William M. Scherzinger, Tucson, AZ (US); Wayne T. Pearson, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 90 days.

(21) Appl. No.: 10/264,999

(22) Filed: Oct. 4, 2002

(65) Prior Publication Data

US 2004/0066098 A1 Apr. 8, 2004

(51) Int. Cl.$^7$ .............................. H02K 9/00; H02K 1/32; H02K 1/20; H02K 9/09
(52) U.S. Cl. .............................. 310/52; 310/54; 310/59; 310/61
(58) Field of Search .............................. 310/52, 54, 59, 310/61

(56) References Cited

U.S. PATENT DOCUMENTS

| | | | | |
|---|---|---|---|---|
| 241,242 A | | 5/1881 | Sawyer et al. ................. | 310/54 |
| 1,448,700 A | | 3/1923 | Seidner ........................ | 310/54 |
| 2,648,789 A | * | 8/1953 | Geyer ........................... | 310/54 |
| 2,780,737 A | | 2/1957 | Labastie et al. .............. | 310/54 |
| 3,030,529 A | | 4/1962 | Jaeschke et al. .............. | 310/53 |
| 3,052,958 A | | 9/1962 | Anderson ..................... | 29/598 |
| 3,089,969 A | * | 5/1963 | Wiedemann ................... | 310/53 |
| 3,189,769 A | | 6/1965 | Willyoung ..................... | 310/52 |
| 3,249,775 A | | 5/1966 | Baylac .......................... | 310/54 |
| 3,260,872 A | | 7/1966 | Potter ........................... | 310/54 |
| 3,591,816 A | * | 7/1971 | Sakamoto et al. ............. | 310/58 |
| 3,617,782 A | * | 11/1971 | Nakamura et al. ............ | 310/11 |
| 3,679,920 A | * | 7/1972 | MacNab et al. ............... | 310/10 |
| 3,800,174 A | | 3/1974 | Butterfield et al. ............ | 310/61 |
| 3,819,308 A | * | 6/1974 | Ishihara et al. ............... | 418/181 |
| 3,845,639 A | * | 11/1974 | Smith et al. ................... | 62/505 |

(Continued)

FOREIGN PATENT DOCUMENTS

JP        11041861 A   *   2/1999   ............ H02K/9/18

Primary Examiner—Darren Schuberg
Assistant Examiner—Pedro J. Cuevas
(74) Attorney, Agent, or Firm—Douglas A. Mullen, Esq.

(57) ABSTRACT

A high speed generator has its main rotor located within the main generator shaft assembly. The main rotor is mounted on a substantially hollow rotor shaft, which is also mounted within the main generator shaft assembly. The main stator surrounds at least a portion of the main generator shaft assembly. Main rotor cooling supply orifices extend through the rotor shaft. Main stator cooling supply orifices, which are in fluid communication with the main rotor cooling supply orifices, extend through the main generator shaft assembly. Cooling fluid is directed into the main generator shaft assembly, and flows through the main rotor cooling supply orifices and the main stator cooling supply orifices. The main rotor and main stator cooling supply orifices are configured to supply the main rotor and main stator with a cooling fluid spray. This configuration reduces the rotational fluid mass associated with flood-cooled rotors, which increases structural integrity, lowers material stresses, improves rotor dynamics.

22 Claims, 6 Drawing Sheets

U.S. PATENT DOCUMENTS

| | | | |
|---|---|---|---|
| 3,991,588 A * | 11/1976 | Laskaris | 62/50.7 |
| 4,101,793 A * | 7/1978 | Berthet et al. | 310/52 |
| 4,119,872 A | 10/1978 | Hunt | 310/61 |
| 4,167,695 A * | 9/1979 | Phillips | 322/12 |
| 4,203,044 A * | 5/1980 | Linscott, Jr. | 310/61 |
| 4,262,224 A | 4/1981 | Kofink et al. | 310/54 |
| 4,309,632 A * | 1/1982 | Muller et al. | 310/52 |
| 4,365,175 A * | 12/1982 | Eckels | 310/53 |
| 4,365,176 A * | 12/1982 | Nathenson et al. | 310/54 |
| 4,448,042 A * | 5/1984 | Yamaguchi et al. | 62/505 |
| 4,600,848 A * | 7/1986 | Sutrina et al. | 310/54 |
| 4,611,137 A | 9/1986 | Sutrina | 310/54 |
| 4,621,210 A | 11/1986 | Krinickas, Jr. | 310/61 |
| 4,647,804 A | 3/1987 | Wefel | 310/60 A |
| 4,647,805 A * | 3/1987 | Flygare et al. | 310/61 |
| 4,683,388 A | 7/1987 | De Cesare | 310/46 |
| 4,734,590 A * | 3/1988 | Fluegel | 290/1 C |
| 4,810,126 A * | 3/1989 | Lengel | 403/322.1 |
| 4,900,959 A | 2/1990 | Drinkut et al. | 310/68 D |
| 4,946,433 A * | 8/1990 | Gorodissky et al. | 494/15 |
| 4,959,570 A | 9/1990 | Nakamura et al. | 310/54 |
| 5,003,207 A * | 3/1991 | Krinickas et al. | 310/52 |
| 5,006,741 A * | 4/1991 | Schott | 310/68 D |
| 5,130,585 A * | 7/1992 | Iwamatsu et al. | 310/59 |
| 5,160,864 A | 11/1992 | Saito | 310/54 |
| 5,424,593 A * | 6/1995 | Vaghani et al. | 310/64 |
| 5,509,381 A | 4/1996 | Fisher | 123/41.31 |
| 5,589,720 A | 12/1996 | Berger | 310/61 |
| 5,664,916 A * | 9/1997 | Link et al. | 409/135 |
| 5,889,342 A | 3/1999 | Hasebe et al. | 310/61 |
| 5,973,427 A | 10/1999 | Suzuki et al. | 310/54 |
| 5,994,804 A * | 11/1999 | Grennan et al. | 310/60 R |
| 6,087,744 A * | 7/2000 | Glauning | 310/58 |
| 6,091,168 A * | 7/2000 | Halsey et al. | 310/61 |
| 6,114,784 A | 9/2000 | Nakano | 310/59 |
| 6,215,212 B1 * | 4/2001 | Grennan et al. | 310/60 R |
| 6,239,520 B1 * | 5/2001 | Stahl et al. | 310/61 |
| 6,351,045 B1 * | 2/2002 | Shoykhet | 310/52 |
| 6,437,468 B2 * | 8/2002 | Stahl et al. | 310/61 |
| 6,488,486 B1 * | 12/2002 | Debleser | 417/423.8 |
| 6,570,276 B1 * | 5/2003 | Morel et al. | 310/52 |
| 6,750,572 B2 * | 6/2004 | Tornquist et al. | 310/54 |
| 6,847,137 B2 * | 1/2005 | Furuse | 310/59 |

\* cited by examiner

HIGH SPEED GENERATOR WITH THE MAIN ROTOR HOUSED INSIDE THE SHAFT

FIELD OF THE INVENTION

The present invention relates to high speed generators and, more particularly, to high speed generators that are used with gas turbine engines such as those used in aircraft, tanks, ships, terrestrial vehicles, or other applications.

BACKGROUND OF THE INVENTION

A generator system for a gas turbine engine, such as that found in aircraft, ships, and some terrestrial vehicles, may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a generator control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft, ship, or vehicle electrical system.

Because some aircraft generators are high speed generators with potential rotational speeds up to and in excess of 24,000 rpm, various mechanical components may be supplied with lubricant. Moreover, some of the electrical components within the generator may generate heat due to electrical losses, and may thus be supplied with a cooling medium. These potentially high rotational speeds can also impose large centrifugal forces on various rotating components, such as the rotor. Given these potentially stressful operating conditions, cooling, rotor dynamics, material stresses, and bearing life may present certain design constraints that may adversely affect generator performance and manufacturing cost.

Hence, there is a need for a high speed generator that addresses the above-noted potential concerns. Namely, a high speed generator that supplies sufficient cooling to its mechanical and electrical components and/or improves rotor dynamics and/or reduces material stresses and/or provides increased bearing life. The present invention addresses one or more of these needs.

SUMMARY OF THE INVENTION

The present invention provides a high speed generator that locates the main generator rotor inside the main generator shaft, and can be designed and configured to provide increased structural integrity, lower material stresses, improved rotor dynamics, and/or reduced bearing span, as compared to present high speed generator designs.

In one embodiment, and by way of example only, a high speed generator, includes a generator housing, a main generator shaft, a rotor shaft, a main rotor, a main stator, at least one main rotor cooling supply orifice, and at least one main stator cooling supply orifice. The main generator shaft assembly is rotationally mounted within the generator housing and has at least an inner surface and an outer surface. The rotor shaft is mounted within the main generator shaft and has at least an inner surface and an outer surface. The main rotor is mounted on the rotor shaft and within the main generator shaft assembly. The main stator is mounted within the generator housing and surrounds at least a portion of the main generator shaft assembly. Each main rotor cooling supply orifice extends between the rotor shaft inner and outer surfaces. Each main stator cooling supply orifice extends between the main generator shaft assembly inner and outer surfaces, is in fluid communication with at least one main rotor cooling supply orifice.

In another exemplary embodiment, a rotor assembly for a high speed generator includes a main shaft assembly, a rotor shaft assembly, a rotor, at least one rotor cooling supply orifice, and at least one stator cooling supply orifice. The main shaft assembly has at least an inner surface and an outer surface. The rotor shaft is mounted within the main shaft assembly and has at least an inner surface and an outer surface. The rotor is mounted on the rotor shaft and within the main shaft assembly. Each rotor cooling supply orifice extends between the rotor shaft inner and outer surfaces. Each stator cooling supply orifice extends between the main shaft assembly inner and outer surfaces and is in fluid communication with at least one rotor cooling supply orifice.

In yet another exemplary embodiment, a shaft assembly for mounting within a high speed generator includes a drive shaft, a fluid supply shaft, a rotor housing, a rotor shaft, and at least one orifice. The drive shaft is adapted to couple to a rotational power source. The fluid supply shaft has an internal fluid flow passageway. The rotor housing is coupled between the drive shaft and the fluid supply shaft and has an inner surface that forms a cavity adapted to mount a rotor assembly therein. The rotor shaft is mounted within the rotor housing cavity and has a first end, a second end, an inner surface, and an outer surface. The rotor shaft first end is coupled to the drive shaft, and the rotor shaft second end is coupled to the fluid supply shaft. Each orifice extends between the rotor shaft inner and outer surfaces and is in fluid communication with the fluid supply shaft internal fluid flow passageway.

The individual components described above and herein in the detailed description have various novel features and thus comprise inventive subject matter.

Other independent features and advantages of the preferred generator, rotor assembly, and shaft assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that for convenience of explanation the present embodiment is depicted and described as being implemented in a brushless AC (alternating current) generator,. However, the present invention is not limited to a brushless AC generator environment, but may be implemented in other AC generator designs needed in specific applications.

Figure 1:
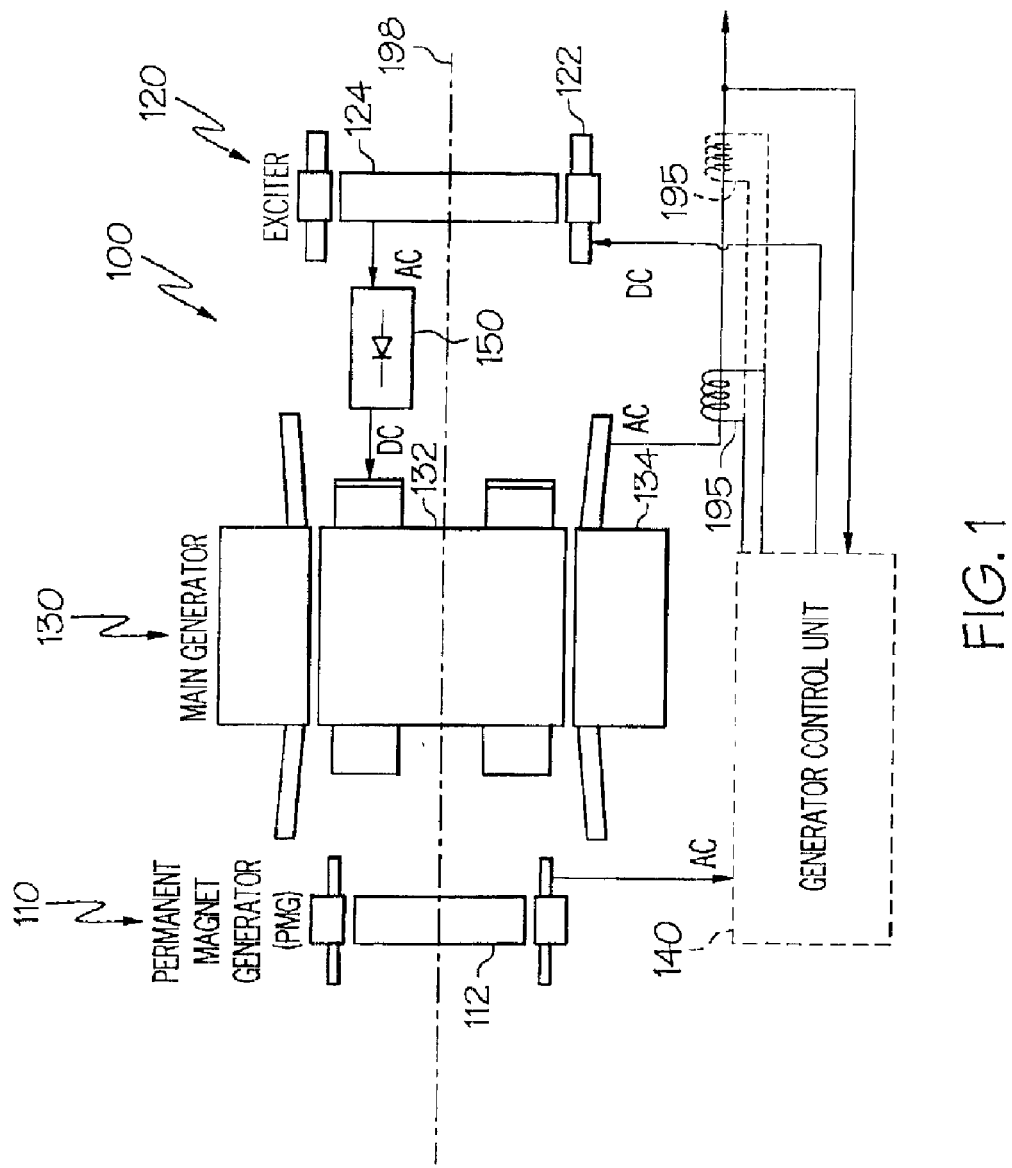
FIG. 1 is a functional schematic diagram of an exemplary high speed generator embodiment.

Turning now to the description, and with reference first to FIG. 1, a functional schematic block diagram of an exemplary high speed generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies, via a PMG stator 114, AC power to the generator control unit 140. The generator control unit 140 supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134.

Figure 2B:
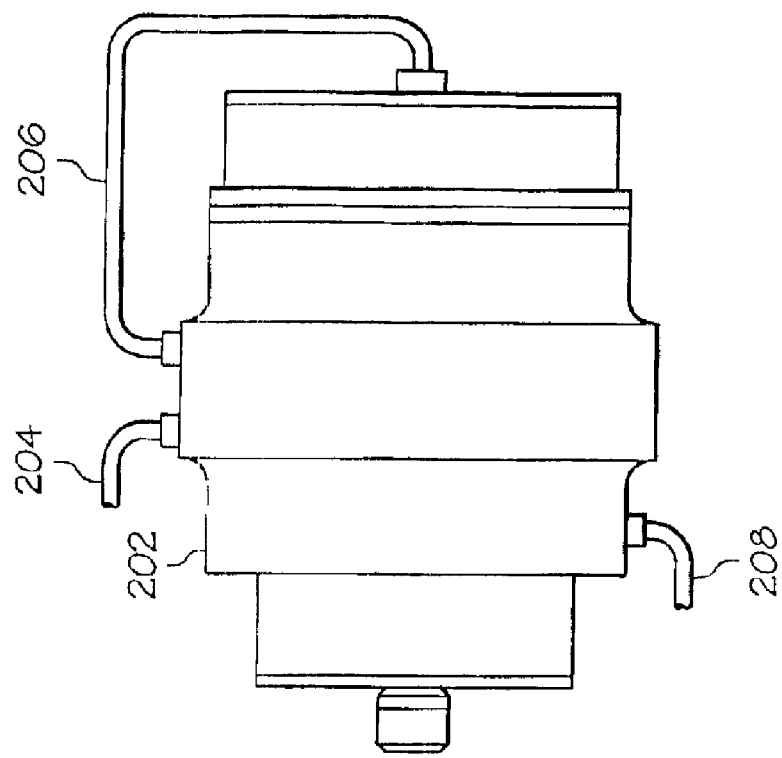
FIGS. 2A and 2B show side and end views of a physical embodiment of the generator shown in FIG. 1.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main generator rotor 132 all rotate along a single axis 198 at the same rotational speed. The generator system 100, or at least portions of the system 100, may be housed within a generator housing 202, end and side views of which are illustrated in FIGS. 2A and 2B, respectively.

Figure 2A:
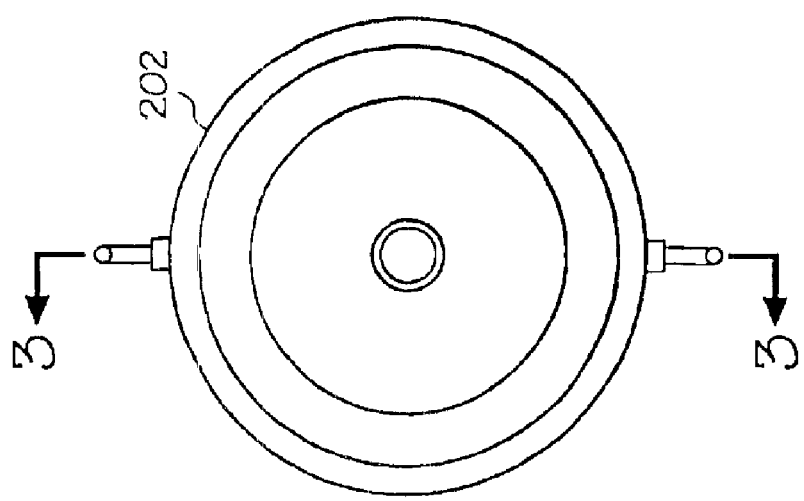
Figure 3:
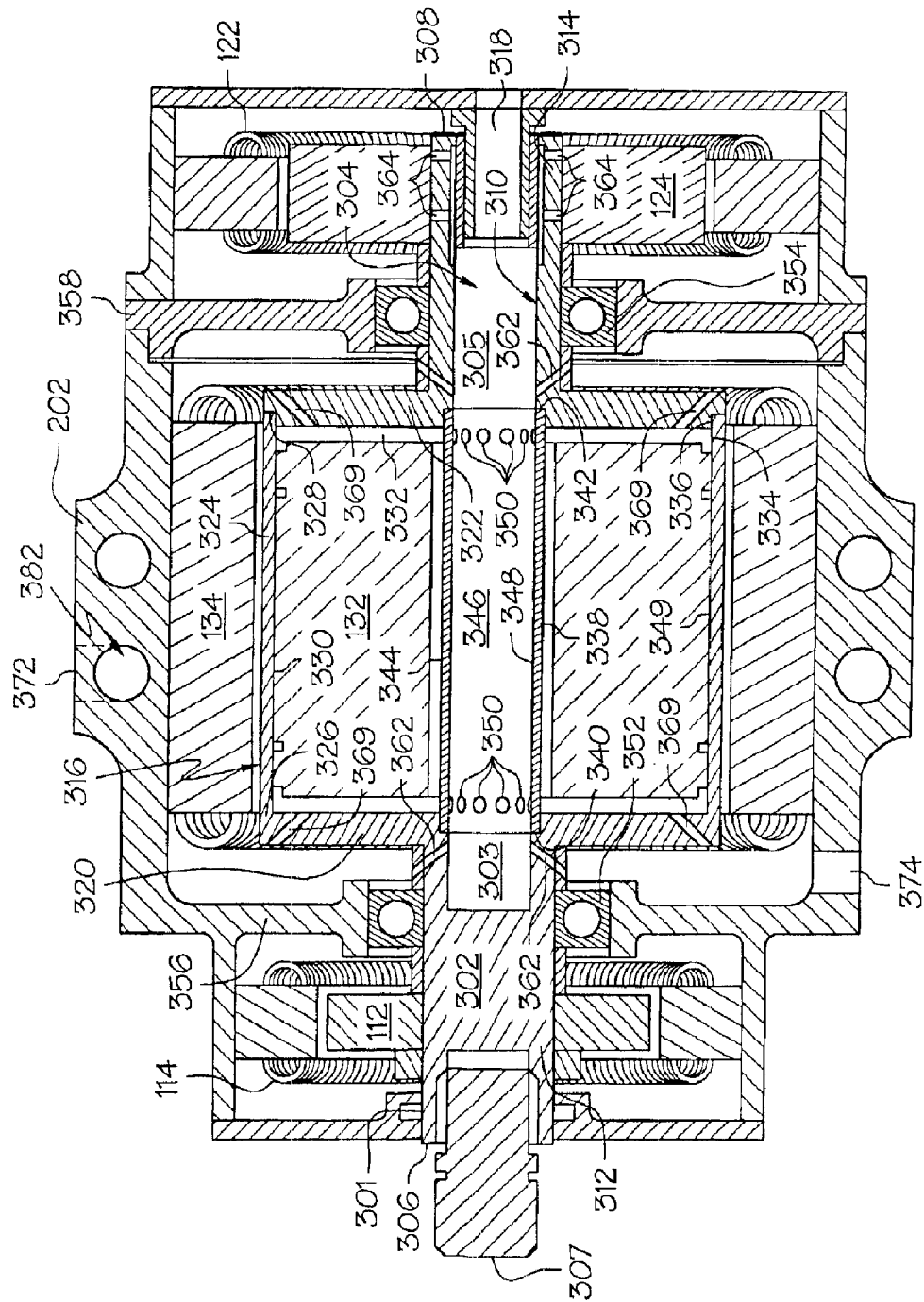
FIG. 3 is a cross section view, taken along line 3—3, of the generator shown in FIG. 2A according to an embodiment of the present invention.
Figure 4:
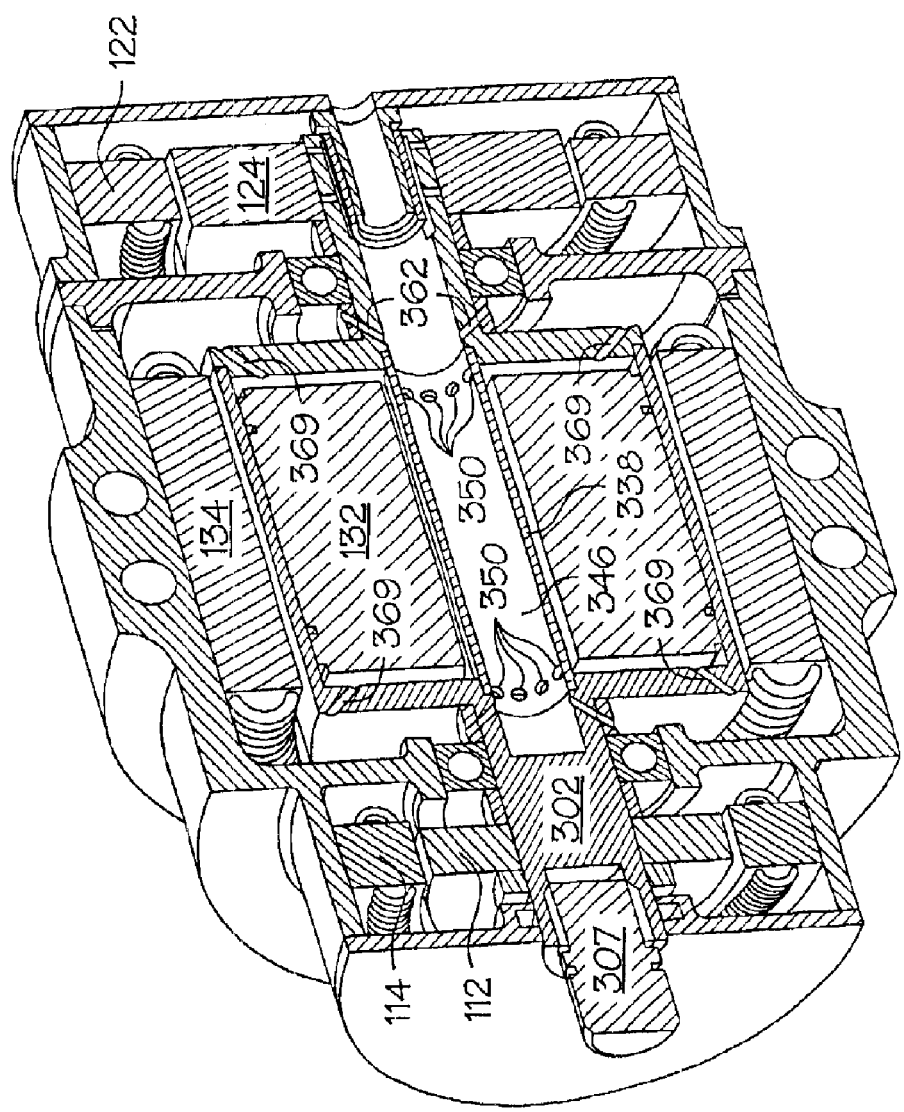
FIGS. 4 and 5 are perspective cross section views of the generator shown in FIGS. 2A and 2B, as viewed from opposite ends thereof.
Figure 5:
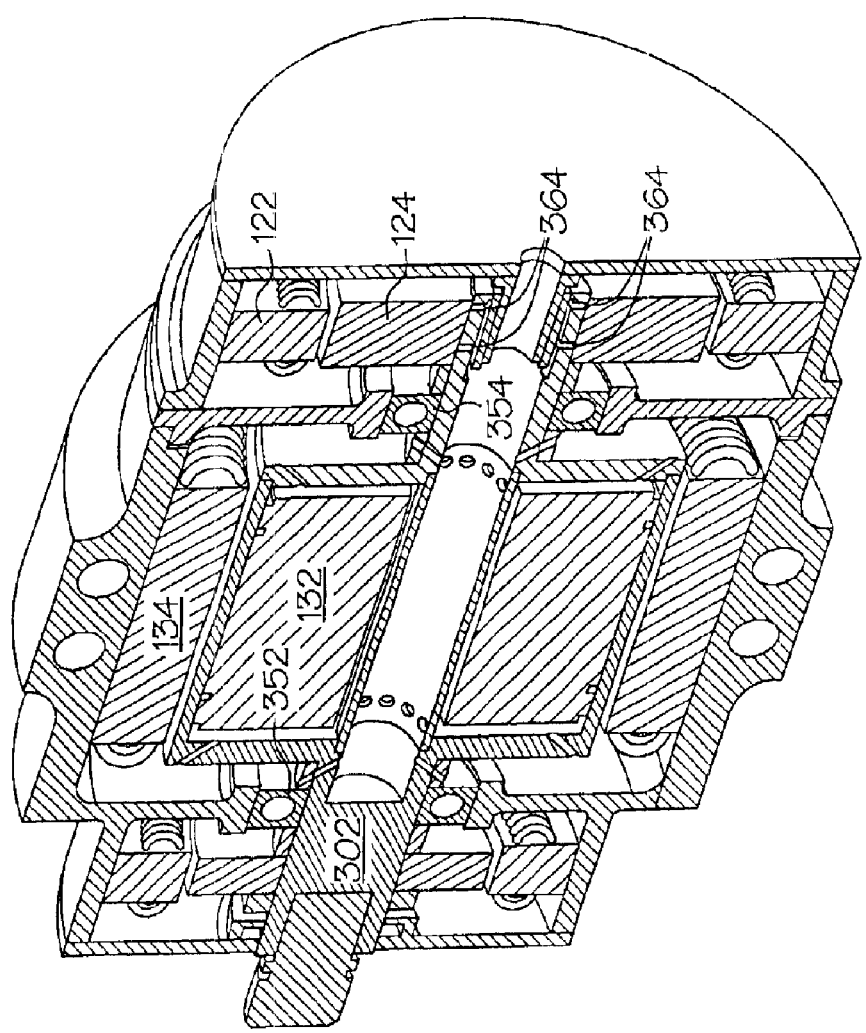
Figure 6:
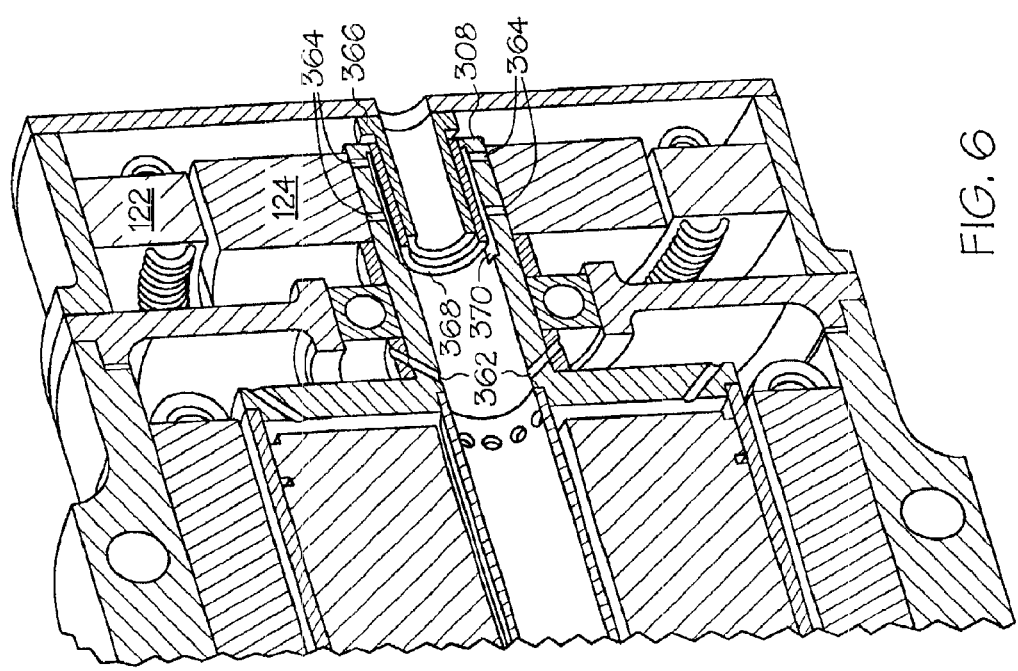
FIG. 6 is a close-up, perspective view of one end of the generator shown in FIGS. 2A and 2B.

Turning now to FIGS. 3–6, which are cross section side and perspective views taken along lines 3—3 in FIG. 2A, it is seen that the generator includes a main generator shaft assembly 302. The main generator shaft assembly 302 includes an outer surface 301 and an axial bore 304 that extends at least partially between a first end 306 and a second end 308, forming an inner surface 310 in the main generator shaft assembly 302. In the depicted embodiment, the main generator shaft assembly 302 includes three sections, a drive shaft 312, a fluid supply shaft 314, and a main rotor enclosure 316. The drive shaft 312 includes the first end 306 of the main generator shaft assembly 302 and a first internal fluid flow passageway 303, which, in the depicted embodiment, includes a portion of the axial bore 304. The drive shaft 312 is adapted, via the first end 306, to couple to a rotational power source such as, for example, a gas turbine engine output (not illustrated). In the depicted embodiment, a spline coupling 307 is used to couple the main shaft assembly first end 306 to the rotational power source.

The fluid supply shaft 314 includes the second end 308 and a second internal fluid flow passageway 305, which, in the depicted embodiment, also includes a portion of the axial bore 304. The fluid supply shaft 314 receives a supply of cooling fluid such as, for example, oil or other lubricant, via an opening 318 in the second end 308. The supplied cooling fluid enters the opening 318 and flows through the second internal fluid flow passageway 305 toward the main rotor enclosure 316.

The main rotor enclosure 316 is coupled between the drive shaft 312 and the fluid supply shaft 314. It will be appreciated that the main rotor enclosure 316 may be constructed in any one of numerous known configurations. In the depicted embodiment, however, it is formed as an assembly, and includes a first end cap 320, a second end cap 322, and a sleeve 324. The first end cap 320 is coupled to the drive shaft 312, and the second end cap 322 is coupled to the fluid supply shaft 314. The sleeve 324 includes a first end 326, which is coupled to the first end cap 320, and a second end 328, which is coupled to the second end cap 322. The sleeve 324 includes an inner surface 330 that forms a cavity 332. In the depicted embodiment, the first end cap 320 and the sleeve 324 are coupled together via, for example, a welding process, or may be integrally formed as a single piece, and the second end cap 322 and the sleeve 324 are coupled together via, for example, mating threads. For example, in the depicted embodiment, a first set of threads 334 is formed on the sleeve inner surface 330 proximate the second end 328, and a second set of threads 336 is formed on an outer surface of a portion of the second end cap 322. It will be appreciated that the configuration and location of the first 334 and second 336 set of threads may vary. For example, the first set of threads 334 could be on an outer surface of the sleeve 324, and the second set of threads 336 could be formed onto an inner surface of the second end cap 322. In the depicted embodiment, the diameter of the cavity 332 is larger than that of the first 303 and second 305 internal fluid supply passageways, and a rotor shaft 338 and the main generator rotor 132 are both mounted within the cavity 332.

The rotor shaft 338 includes at least a first end 340, a second end 342, an outer surface 344, and an axial bore 346 extending between the rotor shaft first 340 and second 342 ends to form an inner surface 348. The rotor shaft first end 340 is coupled to the drive shaft 312 and the rotor shaft second end 342 is coupled to the fluid supply shaft 314. The rotor shaft 338 also includes one or more rotor cooling supply orifices 350 that extend between the rotor shaft inner 348 and outer 344 surfaces. In the depicted embodiment, the rotor cooling supply orifices 350 are provided on the rotor shaft first 340 and second 342 ends. However, it will be appreciated that the orifices 350 may be provided on only one of the rotor shaft ends 340, 342. The rotor cooling supply orifices 350 are each in fluid communication with the second internal fluid flow passageway 305.

The main generator rotor 132 is mounted on the rotor shaft 338 and, as was alluded to above, within the main rotor enclosure 316 section of the main shaft assembly 302. In a particular preferred embodiment, the main generator rotor 132 is mounted on the rotor shaft 338 and is then mounted within the main rotor enclosure 316 using a shrink fit process. Thus, the main generator rotor 132 physically contacts an inner surface 349 of the main rotor enclosure 316.

The main shaft assembly 302 is rotationally mounted within the generator housing 202 via bearing assemblies. In the depicted embodiment, a first bearing assembly 352 and a second bearing assembly 354 are mounted in the generator housing 202 via first 356 and second 358 bearing mounts, respectively. As will be described more fully below, the first 352 and second 354 bearing assemblies are lubricated and cooled with cooling fluid that is supplied to the second internal fluid flow passageway 305. To accomplish this, at least two bearing assembly cooling supply orifices 362 extend between the main shaft assembly inner 310 and outer 301 surfaces.

The PMG rotor 112 and exciter rotor 124 are both mounted on the main shaft assembly 302. In the depicted embodiment, the PMG rotor 112 is positioned near the main shaft assembly first end 306, and the exciter rotor 124 is positioned near the main shaft assembly second end 308. In a preferred embodiment, the first bearing assembly 352 is positioned between the PMG rotor 112 and the first end cap 320, and the second bearing assembly 354 is positioned between the exciter rotor 124 and the second end cap 322. It will be appreciated, however, that the position of the PMG rotor 112, the exciter rotor 124, and the first 352 and second 354 bearing assemblies is not limited to this particular positional configuration.

The main generator stator 134, the PMG stator 114, and the exciter stator 122 are also mounted within the generator housing 202. The main generator stator 134 is positioned such that it surrounds at least a portion of the main shaft assembly 302, and preferably at least a portion of the main rotor enclosure 316. The PMG stator 114 preferably surrounds at least a portion of the PMG rotor 112, and the exciter stator 122 preferably surrounds at least a portion of the exciter rotor 124. As will be described more fully below, at least the exciter 120 and the main generator stator 134 are cooled with cooling fluid that is supplied to the second fluid flow passageway 305.

The cooling fluid is supplied to the exciter 120 via one or more exciter cooling supply orifices 364. The exciter cooling supply orifices 364 are preferably positioned proximate the exciter 120, extend between the main shaft assembly inner 310 and outer 301 surfaces, and are in fluid communication with the second internal fluid flow passageway 305. In particular, as shown most clearly in FIG. 6, the cooling fluid is supplied to the second internal fluid flow passageway 305 via a feed tube 366. A journal bushing 368 surrounds at least a portion of the oil feed tube 366. At least one groove 370 is formed on the main shaft assembly inner surface 310, which fluidly communicates the exciter cooling supply orifices 364 with the second internal fluid flow passageway 305.

The cooling fluid is supplied to the main generator stator 134 via one or more main stator cooling supply orifices 369. The main stator cooling supply orifices 369 are preferably positioned proximate the main generator stator 134, extend between the main shaft assembly inner 310 and outer 301 surfaces, and are in fluid communication with the at least one rotor cooling supply orifice 350. Although the position of the main stator cooling supply orifices 369 may vary, in the depicted embodiment, at least one main stator cooling supply orifice 369 is formed through each of the main rotor enclosure first 320 and second 322 end caps.

The cooling fluid may be supplied to and removed from the generator in any one of numerous ways. In the depicted embodiment, the cooling fluid is supplied to the generator via one or more fluid inlet ports 372 formed in the generator housing 202, and is removed from the generator via one or more fluid outlet ports 374, which are also formed in the generator housing 202. More specifically, and with reference back to FIG. 2B, in the depicted embodiment fluid is supplied to the generator housing 202 via a fluid supply conduit 204. As will be described more fully below, the fluid in the fluid supply conduit 204 enters the generator housing 202, circulates through a main generator stator back iron cooling flow path 382 (see FIGS. 3–6), and then exits the generator housing 202. The main generator stator back iron cooling flow path 382 circulates oil at least through the portion of the housing 202 that surrounds the main generator stator 134.

Upon exiting the generator housing 202, the cooling fluid enters a shaft supply conduit 206. The shaft supply conduit 206 directs the cooling fluid into the main shaft assembly 302, via the feed tube 366. It will be appreciated that either, or both, the fluid supply conduit 204 and the shaft supply conduit 206 may be integrally formed as part of the generator housing 202, or a separate conduits that are coupled to the generator housing 202. The cooling fluid exits the generator housing 202 via the outlet ports 374 and returns to a cooling fluid supply via a fluid return conduit 208.

Having described the generator system 100 and the various cooling and lubricating flow paths to and through the generator housing 202 for a structural standpoint, a complete description of cooling and lubricating fluid flow to, through, and out of the generator housing 202 will now be described. In doing so, reference should be made to FIGS. 2-6 in combination.

The cooling fluid enters the generator housing 202 via the fluid supply conduit 204, which is in fluid communication with the main generator stator back iron cooling flow passage 382. After circulating through the main generator back iron cooling flow passage 382, the fluid exits the generator housing 202 and enters the shaft supply conduit 206. The shaft supply conduit 208 directs the cooling fluid back into the generator housing 202.

The cooling fluid enters the generator housing 202, and flows into and through the feed tube 366 and into the main shaft assembly 302. Upon entering the main shaft assembly 302, the cooling fluid first enters second internal fluid flow passageway 305 that is formed in the fluid supply shaft 314. The fluid in the second internal fluid flow passageway 305 is directed into one of at least three different flow paths. One fraction of the fluid flows into the groove 370 formed on the main generator shaft assembly inner surface 310, and is directed into and through the exciter cooling supply orifices 364. A second fraction of the fluid in the second internal fluid flow passageway 305 flows into and through the bearing assembly cooling supply orifices 362 positioned near the second bearing assembly 354. The bearing assembly cooling supply orifices 362 are configured to spray the fluid onto the second bearing assembly 354 to provide the second bearing assembly 354 with both cooling and lubrication. The remaining fraction of the fluid in the second internal fluid flow passageway 305 enters the rotor shaft 338.

As the cooling fluid enters the rotor shaft 338, some of the cooling fluid is directed into the main rotor enclosure 316, via the rotor cooling supply orifices 350 formed in the rotor shaft first 340 and second 342 ends. The rotor cooling supply orifices 350 are configured to supply a spray of cooling fluid to the main generator rotor 132 that is mounted in the main rotor enclosure 316. The cooling fluid that is directed into the main rotor enclosure 316 flows out one of the main stator cooling supply orifices 369. Similar to the rotor cooling supply orifices 350, the main stator cooling supply orifices 369 are configured to supply a spray of cooling fluid onto the main stator 134.

The cooling fluid that does not flow through the rotor cooling supply orifices 350 exits the rotor shaft 338 and is directed into and through the bearing assembly cooling supply orifices 362 positioned near the first bearing assembly 352. The orifices 362 are also configured to spray the fluid onto the first bearing assembly 352 to provide the first bearing assembly 352 with both cooling and lubrication.

The cooling fluid that is directed to the exciter 120, the main generator stator 134, and the first 352 and second 354 bearing assemblies, then flows to a section of the generator housing 202 that collects the fluid. The cooling fluid then exits the generator housing 202 via the outlet port 374.

The high speed generator described herein locates the main generator rotor inside the main generator shaft assembly and is configured to provide spray cooling to at least the main rotor. This configuration reduces the rotational fluid mass associated with flood-cooled rotors, which increases structural integrity, lowers material stresses, and/or improves rotor dynamics, as compared to presently known generator designs. The configuration also reduces bearing span as compared to presently known high speed generator designs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A high speed generator, comprising:
   a generator housing;
   a main generator shaft assembly rotationally mounted within the generator housing, the main generator shaft assembly having at least an inner surface and an a surface;
   rotor shaft mounted within the main generator shaft assembly, the rotor shaft having at least a first end, a second end, an inner surface, and an outer surface;
   main rotor mounted on the rotor shaft and within the main generator assembly;
   main stator mounted within the generator housing and surrounding least a portion of the main generator shaft assembly;
   a first and a second main rotor cooling supply orifice extending between the rotor shaft inner and outer surfaces, the first main rotor cooling supply orifice disposed proximate the rotor shaft first end and the second main rotor cooling supply orifice disposed proximate the rotor shaft second end; and
   a first and a second main stator cooling supply orifice extending between the main generator shaft assembly inner and outer surfaces, the first and second stator cooling supply orifices in fluid communication with the first second main rotor cooling supply orifices, respectively.

2. The generator of claim 1, wherein the main generator assembly comprises:
   drive shaft adapted to couple to a rotational power source;
   a fluid supply shaft having an internal fluid flow passageway in fluid communication with at least one main rotor cooling supply orifice and a supply of fluid; and
   a main rotor enclosure coupled between the drive shaft and the fluid supply shaft and having an inner surface that forms a cavity in which the main rotor is mounted.

3. The generator of claim 2, wherein the main rotor enclosure comprises:
   a first end cap having at least a portion thereof coupled to the drive shaft;
   a second end cap having at least a portion thereof coupled to the fluid supply shaft; and
   a sleeve having a first end and a second end, at least a portion of the sleeve first end coupled to at least a portion of the first end cap, and at least a portion of e sleeve second end coupled to at least a portion of the second end cap.

4. The generator of claim 3, wherein the first and second end caps each include at least one main stator cooling supply orifice.

5. The generator of claim 3, wherein at least one of the first end cap and the second end cap is threadedly coupled to the sleeve.

6. The generator of claim 2, wherein:
   the internal fluid flow passageway has a first diameter; and
   the main rotor enclosure cavity has a second diameter, the second diameter larger than the first diameter.

7. The generator of claim 1, further comprising:
   at least one stator cooling flow path extending through the generator housing and positioned adjacent the stator, each stator cooling flow path having inlet in fluid communication with a fluid supply and an outlet in fluid communication with at least one main rotor cooling supply orifice.

8. The generator of claim 1, further comprising:
   at least two bearing assemblies mounted within the generator housing and rotationally mounting the main generator shaft assembly therein;
   at least two bearing assembly cooling supply orifices extending between the main generator shaft assembly inner and outer surfaces, at least one of the assembly cooling supply orifices positioned proximate each of the bearing assemblies.

9. The generator of claim 8, further comprising:
   an exciter rotor mounted on the main generator shaft assembly proximate a first end thereof; and
   a permanent magnet generator rotor mounted on the main generator shaft assembly proximate a second end thereof;
   wherein at least a first one of the bearing assemblies is positioned between the exciter rotor and the main rotor, and at least a second one of the bearing assemblies is positioned between the permanent magnet generator rotor and the main rotor.

10. The generator of claim 9, further comprising:
    at least one exciter rotor cooling supply orifice positioned proximate the exciter rotor and extending between the main generator shaft assembly inner and outer surfaces.

11. The generator of claim 9, further comprising:
    an exciter stator mounted within the generator housing and surrounding at least a portion of the exciter rotor; and
    a permanent magnet generator stator mounted within the generator housing and surrounding at least a portion of the permanent magnet generator rotor.

12. A rotor assembly for a high speed generator, comprising:
    a main shaft assembly having at least an inner surface and an outer surface;
    a rotor shaft mounted within the main shaft assembly, the rotor shaft having at least at inner surface and an outer surface;
    a rotor mounted on the rotor shaft and within the main shaft assembly;

a first and a second rotor cooling supply orifice extending between the rotor shaft inner and outer surfaces, the first main rotor cooling supply orifice disposed proximate the rotor shaft first end and the second main rotor cooling supply orifice disposed proximate the rotor shaft second end; and a first and a second stator cooling supply orifice extending between the main shaft assembly inner and outer surfaces, the first and second stator cooling supply orifices in fluid communication the first and second rotor cooling supply orifices, respectively.

13. The rotor assembly of claim 12, wherein the main shall assembly comprises:

a drive shaft adapted to couple to a rotational power source;

a fluid supply shaft having an internal fluid flow passageway in fluid communication with at least one main rotor cooling supply orifice and a supply of fluid; an rotor enclosure coupled between the drive shaft and the fluid supply shaft and having an inner surface that forms a cavity in which the rotor is mounted.

14. The rotor assembly of claim 13, wherein the rotor enclosure comprises:

a first end cap having at least a portion thereof coupled to the drive shaft;

a second end cap having at least portion thereof coupled to the fluid supply shaft; and a sleeve having a first end and a second end, at least a portion of the sleeve first end coupled to at least a portion of the first end cap, and at least a portion of the sleeve second end coupled to at least a portion of the second end cap.

15. The rotor assembly of claim 14, wherein the first and end caps each include at least one main stator cooling supply orifice.

16. The rotor assembly of claim 14, wherein at least one of a first end cap and the second end cap is threadedly coupled to the sleeve.

17. The rotor assembly of claim 13, wherein:

the internal fluid flow passageway has a first diameter; and the rotor enclosure cavity has a second diameter, the second diameter larger than the first diameter.

18. A shaft assembly for mounting within a high speed generator, comprising:

a drive shaft adapted to couple to a rotational power source;

a fluid supply shaft having an internal fluid flow passageway;

a rotor housing coupled between the drive shaft and the fluid supply and having an inner surface that forms a cavity adapted to mount a rotor assembly therein;

a rotor shaft mounted within the rotor housing cavity and having a first end, a second end, an inner surface and an outer surface, the rotor shaft first end coupled to the drive shaft, and the rotor shaft second end coupled to the fluid supply shaft; and a first and a second orifice extending between the rotor shaft inner and outer surface and in fluid communication with the fluid supply shaft internal fluid flow passageway, the first orifice disposed proximate the rotor shaft first end and the second orifice disposed proximate the rotor shaft second end.

19. The shaft assembly of claim 18, wherein the rotor housing comprises:

a first end cap having at least a portion thereof coupled to the drive shaft;

a second end cap having at least a portion thereof coupled to the fluid supply shaft; and a sleeve having a first end and a second end, at least a portion of the sleeve first end coupled to at least a portion of the first end cap, and at least a portion of the sleeve second end coupled to at least a portion of the second end cap.

20. The shaft assembly of claim 19, wherein the first and second end caps each include at least one second orifice.

21. The shaft assembly of claim 19, wherein at least one of the first end cap and the second end cap is threadedly coupled to the sleeve.

22. The shaft assembly of claim 18, wherein:

the internal fluid flow passageway has a first diameter; and the rotor housing cavity has a second diameter, the second diameter larger than the first diameter.

* * * * *

UNITED STATES PATENT AND TRADEMARK OFFICE
CERTIFICATE OF CORRECTION

PATENT NO. : 6,897,581 B2
DATED : May 24, 2005
INVENTOR(S) : Kieran P.J. Doherty et al.

It is certified that error appears in the above-identified patent and that said Letters Patent is hereby corrected as shown below:

Column 7,
Line 29, delete "a" and add -- outer --.
Line 31, add the word -- a -- in front of the word "rotor".
Line 34, add the word -- a -- in front of the first appearance of the word "main".
Line 35, add the word -- shaft -- after the word "generator".
Line 36, add the word -- a -- in front of the word "main".
Line 37, add the word -- at -- in front of the word "least".
Line 50, add the word -- and -- in front of the word "second".
Line 53, add the word -- shaft -- in front of the word "assembly".
Line 54, add the word -- a -- in front of the word "drive".

Column 8,
Line 3, delete "e" and add -- the --.
Line 32, add the word -- bearing -- before the word "assembly".
Line 64, delete "at" and add -- an --.

Column 9,
Line 13, delete the word "shall" and add -- shaft --.
Line 18, delete the word "an" and add -- and --.
Line 19, add the word -- a -- in front of the word "rotor".
Line 27, add the word -- a -- after the word "least".
Line 35, add the word -- second -- in front of the word "end".
Line 38, delete the word "a" and add -- the --.

Column 10,
Line 8, add the word -- shaft -- after the word "supply".

Signed and Sealed this

Eighth Day of November, 2005

JON W. DUDAS
*Director of the United States Patent and Trademark Office*